United States Patent [19]

Ogawa

[11] Patent Number: 5,694,203
[45] Date of Patent: Dec. 2, 1997

[54] DISTANCE CAMERA DEVICE HAVING LIGHT GATE FOR EXTRACTING DISTANCE INFORMATION

[75] Inventor: Yasuji Ogawa, Otone-machi, Japan

[73] Assignee: Kabushikikaisha Wacom, Japan

[21] Appl. No.: 381,185

[22] Filed: Jan. 31, 1995

[51] Int. Cl.$^6$ .............................. G01C 3/08; H04N 7/00; H04N 5/232

[52] U.S. Cl. ........................... 356/5.04; 348/31; 348/348

[58] Field of Search ...................... 348/348, 31; 356/5.04

[56] References Cited

U.S. PATENT DOCUMENTS

| | | |
|---|---|---|
| 3,899,250 | 8/1975 | Bamberg et al. . |
| 4,915,498 | 4/1990 | Malek . |
| 5,220,164 | 6/1993 | Lieber et al. . |
| 5,434,612 | 7/1995 | Nettleton et al. ...................... 348/31 |
| 5,467,122 | 11/1995 | Bowker et al. ...................... 348/31 |

FOREIGN PATENT DOCUMENTS 1100492  4/1989  Japan .

*Primary Examiner*—Stephen C. Buczinski
*Attorney, Agent, or Firm*—Adams & Wilks

[57] ABSTRACT

A range imaging device such as a distance camera is improved by incorporating an oscillator to generate a reference signal, a light source to emit a light modulated in accordance with the reference signal and to project the light onto a three-dimensional target. A condenser lens collects and condenses a secondary light reflected by the target and projects the secondary light onto a gating image intensifier, which selectively gates the secondary light in synchronism with a pair of out-of-phase gate signals generated in accordance with the reference signal. Range information contained in the secondary light is extracted by the gating process. A CCD camera receives the gated secondary light and produces a corresponding image signal which is processed to produce a range image of the target.

21 Claims, 10 Drawing Sheets

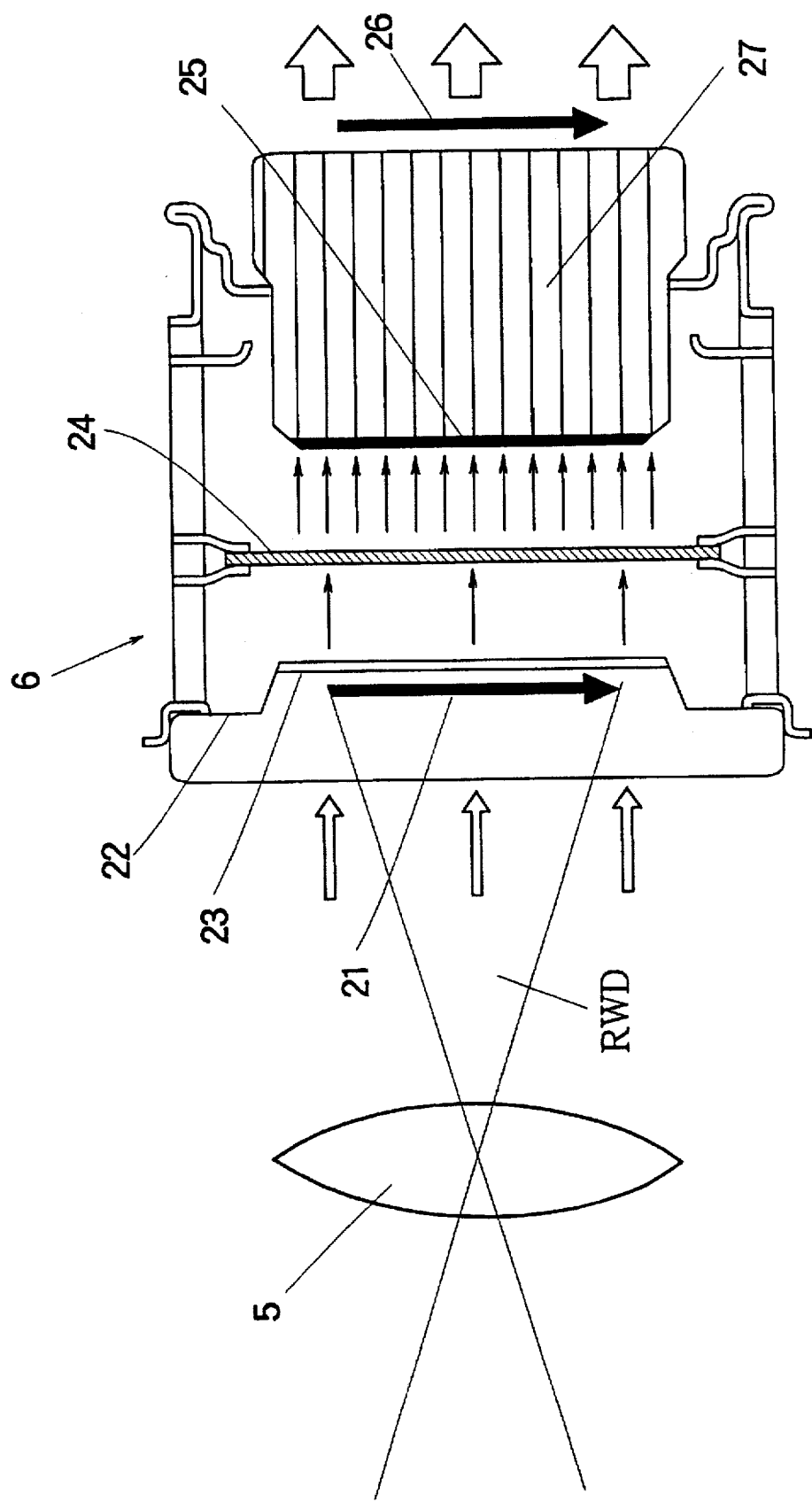

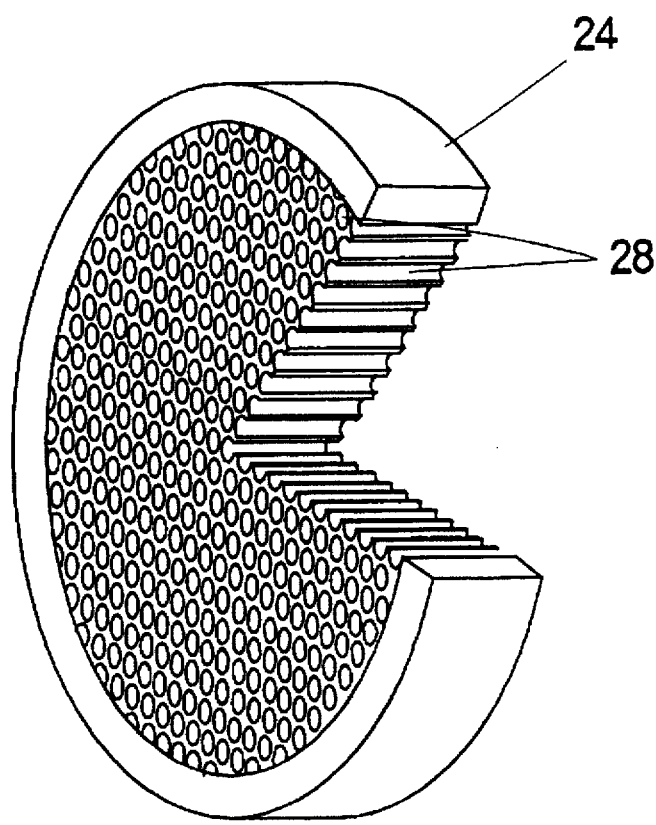
FIG.6
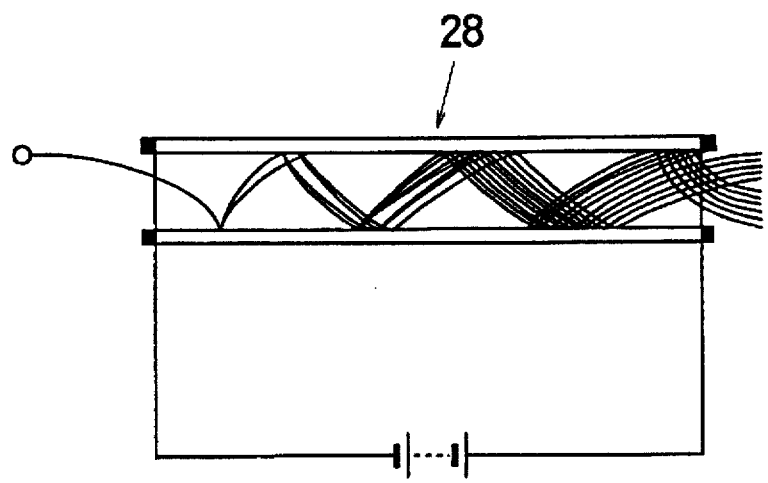

DISTANCE CAMERA DEVICE HAVING LIGHT GATE FOR EXTRACTING DISTANCE INFORMATION

BACKGROUND OF THE INVENTION

The present invention relates, in general, to a distance measuring equipment (DME) or distance camera for detecting a three-dimensional shape of an object with a noncontact manner, and more particularly to a distance camera which is suitable for image-forming or projecting, in a real time, a distance image of a far remoted object.

A conventional distance camera device illuminates an object at a predetermined incident angle, and a reflected light is received by a camera device, and a three-dimensional shape of the object is detected from both the incident angle and the reflection angle. This is a method of utilizing so-called trigonometric leveling. However, in respect of the conventional distance camera device described above, if there is a long distance between the distance camera and the object, a light projector should be spaced far away from the light intercepting (receiving) device in order to obtain an accurate measuring data and, thus the light projector and the light receiver must be spaced from each other at a long distance therebetween. Therefore, it is not easy to proceed with measurement of the long distant object.

Another prior art device is disclosed in Japanese Patent Publication (Unexamined) No. 1-100492, which is shown in FIG. 11. Referring to FIG. 11, an output light from a laser device 101 is modulated in its intensity by means of an optical modulator 102 which is driven by an oscillator 103. The modulated laser light passes through an opening of an aperture mirror 104 and is irradiated to an object 106 by a scanner 105. Scattered light from the object 106 is directed through the scanner 105 and reflected by the aperture mirror 104 and collected to a photo-detector 108 through a condenser (light collection lens) 107. The photo-detector 108 serves to convert the collected light into an electric signal. This electric signal changes its amplitude in accordance with a reflectance of the object 106 and a distance to the object 106. Therefore, detection of an intensity of the electric signal by means of an amplitude detector 109 and sweeping of the laser light by the scanner 105 can provide a picture having a luminance which is similar to that of measurement by a TV camera. Since the phase of an electric signal is delayed in proportion to the distance to the object 106, a measurement of the phase difference between the electric signal and a reference signal from the oscillator 103 by means of a phase detector 110 can provide a distance to the object 106. Distance L can be obtained by a formula $L=c\phi/(4\pi f)$, provided that a phase difference is represented by $\phi$, light velocity by c and laser intensity modulation frequency by f. By scanning the laser light by the scanner 105, a distance picture which is different from the aforementioned luminance picture can be obtained.

The technique which utilizes the light velocity basically detects three-dimensional coordinates of one point which is focused by a laser beam. Therefore, in order to obtain a distance picture of the three-dimensional object, it is necessary to scan the laser beam along a surface of the object to thereby compute the three dimensional coordinates for each point, which requires substantial time for obtaining one complete distance picture. Thus, it has been difficult to obtain a real time picture of moving objects.

SUMMARY OF THE INVENTION

An object of the present invention is to provide a high speed distance camera device which can photograph a distance picture of all object located at a distance.

According to the present invention, there is provided a distance camera which comprises, as basic elements, oscillator means, projector means, condenser means, light gate means, camera means and computing means. The oscillator means generates a reference signal as a time reference. The projector means emits a primary light which is modulated in accordance with the reference signal and then irradiates it to a target of the three-dimensional object. The condenser means collects the secondary light which is reflected back from the targeted object. The light gate means is located in the passage of the secondary light and carries out gating of the passing secondary light in synchronism with a gate signal, so that distance information, contained in the secondary light, of the target object is extracted. The camera means receives the gated secondary light and outputs a corresponding image signal. The computing means processes the image signal and produces a distance picture of the target object.

Preferably, the light gate means processes the passing second light in a manner of space division or time division, in synchronism with a pair of gate signals which have different phases by 90° from each other, and extracts distance information consisting of phase components orthogonal to each other. The gate means may perform gating of the passing secondary light in a manner of space division or time division, in synchronism with a pair of gate signals which have different phases by 180° with each other, and extracts distance information containing a pair of positive/negative phase components.

In addition to the above, the projector means may project a primary light which is intermittently modulated (pulse-modulated) and, on the other hand, the light gate means may carry out gating of the secondary light in synchronism with an intermittent gate signal to extract suitable distance information. Alternately, the projector means can project a primary light which is continuously modulated (for example, amplitude-modulated) and, on the other hand, the light gate means carries out gating of the secondary light in synchronism with a continuous gate signal to thereby extract desired distance information. In this case, the camera means may preferably be of the storage type such as CCD image sensor, so that it cooperates with the light gate means to effectively execute scalar product computing of the secondary light and the gate signal to thereby obtain correlated distance information.

In the present invention, the primary light composed of modulated light wave is utilized to irradiate (i.e., illuminate) the target object. The secondary light reflected from the target object has a phase delay in accordance with the distance to the object, and distance information is contained therein. This secondary light is gate-processed by the light gate means which is driven at a high speed and the distance information (phase information) is selectively extracted. The camera means is composed of CCD image sensor, for example, and picks up the distance information for each picture element. This can provide an accurate real time detection of a distance picture of the three-dimensional object located remotely. The CCD image sensor is not so fast in response to detect the phase of the light wave and, therefore, in the present invention the high speed light gate means is disposed upstream of the camera means composed, for instance, of the CCD image sensor and the like to thereby detect the phase of the light wave. At this moment, a pair of gate signals of 180° phase difference are utilized to control an open/close operation of the light gate means, so that distance information containing a pair of positive/negative phase components is extracted. This enables computing of a negative part of correlation computing at the time of phase detection and, thus, a phase detection of high accuracy, with a DC component deleted, can be achieved. Further, a pair of gate signals of 90° phase difference are utilized to control an open/close operation of the light gate means so that distance information having phase components which are orthogonal with each other can be extracted. By obtaining a ratio of the orthogonal phase components, a phase detection of high accuracy can be achieved with less time.

BRIEF DESCRIPTION OF THE DRAWINGS

FIG. 4 is a sectional view of a gate-installed image intensifier showing an exemplified structure thereof.

FIG. 5 is a perspective view of the image intensifier shown in FIG. 4.

FIG. 6 is an explanatory view of the image intensifier showing the function thereof.

DETAILED DESCRIPTION OF THE PREFERRED EMBODIMENTS

Preferred embodiments of the present invention will now be described with reference to the drawings.

Figure 1:
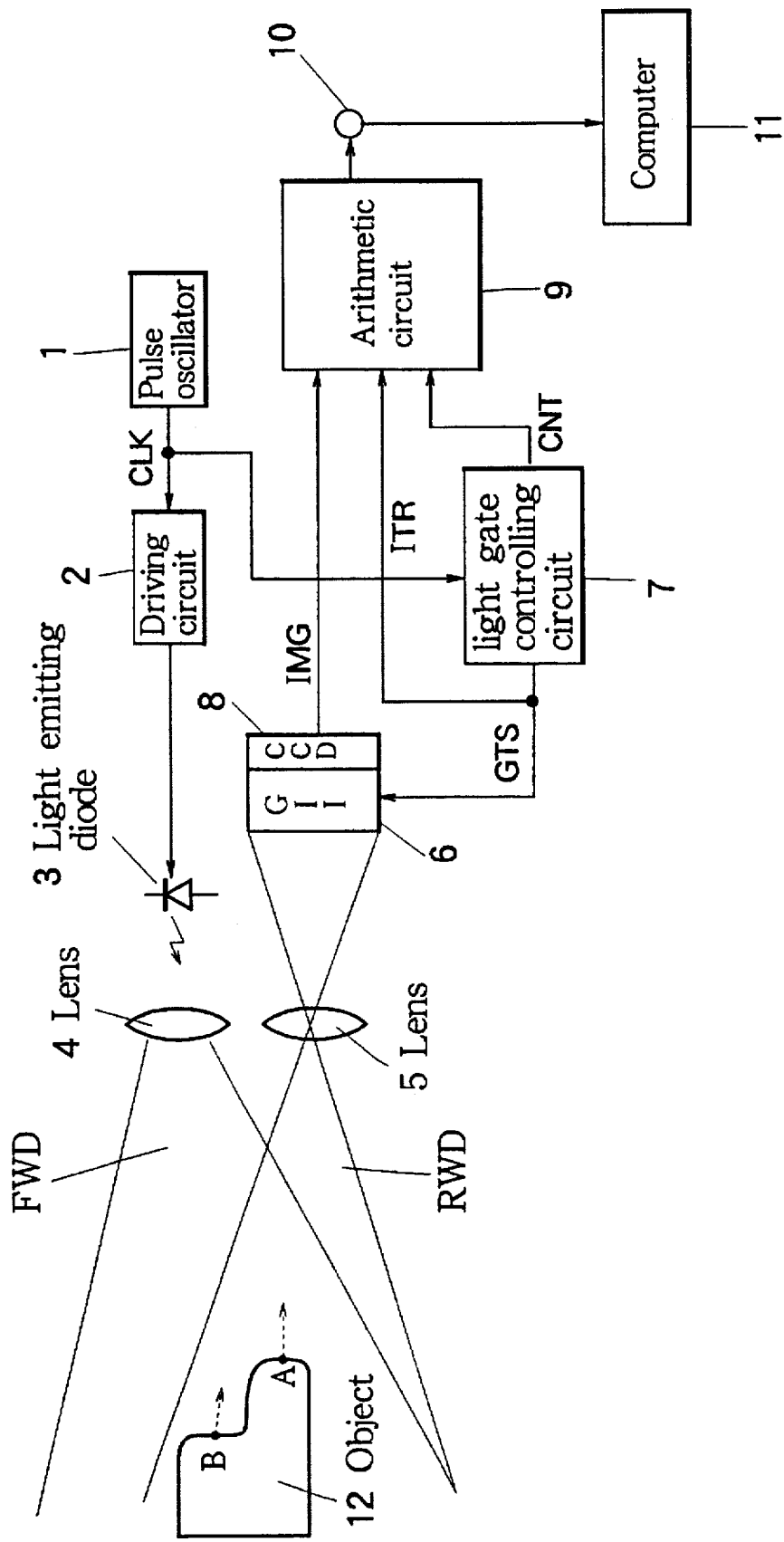
FIG. 1 is a block diagram of a distance camera device according to a first embodiment of the present invention.

In FIG. 1 showing a distance camera device of the first embodiment of the invention, the distance camera has oscillating means in the form of a pulse oscillator 1 which generates a predetermined clock signal CLK (reference signal) for a time reference. The distance camera has projecting means composed of a driving circuit 2, a light emitting diode 3 and a lens 4 to irradiate a primary light FWD which is intermittently modulated (pulse-modulated) in accordance with the clock signal CLK and to illuminate a target object 12. The target object 12 has a first portion A which is relatively close or proximal to the camera and a second portion B which is relatively distal to the camera.

A condensing (light collecting) means has a lens 5 to collect a secondary light RWD reflected back from the target object 12. The condensing means can be composed of a slit or pinhole rather than the lens 5. At the back of the lens 5 is provided a gating image intensifier (GII) 6 which forms a light gate means. The gating image intensifier 6 is disposed in the passage way of the secondary light RWD and carries out gating of the passing light in synchronism with a predetermined gate signal GTS to extract distance information of the target object, the distance information being included in the secondary light RWD. Although the light gate means is located at the back of condensing lens 5 in the illustrated embodiment, the light gate means can be disposed in the forward position relative to the condensing lens 5. The gating image intensifier 6 is connected to a light gate controlling circuit 7 which generates the gate signal GTS in accordance with the clock signal CLK. The gating image intensifier 6 is also coupled to a CCD image sensor 8 to form a camera means. The CCD image sensor 8 receives the gated secondary light RWD and outputs a corresponding image signal IMG. Further, the CCD image sensor 8 is connected to a computing (arithmetic) circuit 9 which operates for computing the image signal IMG to produce a distance picture of the target object 12. This computing process is executed in response to an interrupting signal ITR which is supplied from the light gate controlling circuit 7. The arithmetic circuit 9 executes computing of the image signal IMG with the utilization of a count signal CNT supplied from the light gate controlling circuit 7. The arithmetic circuit 9 is connected to a computer 11 through an output terminal 10. The computer 11 executes various controlling processes in accordance with the distance picture of the target object 12. For example, when the target object is an arm of a robot, a real time controlling system for the robot can be obtained.

Figure 2:
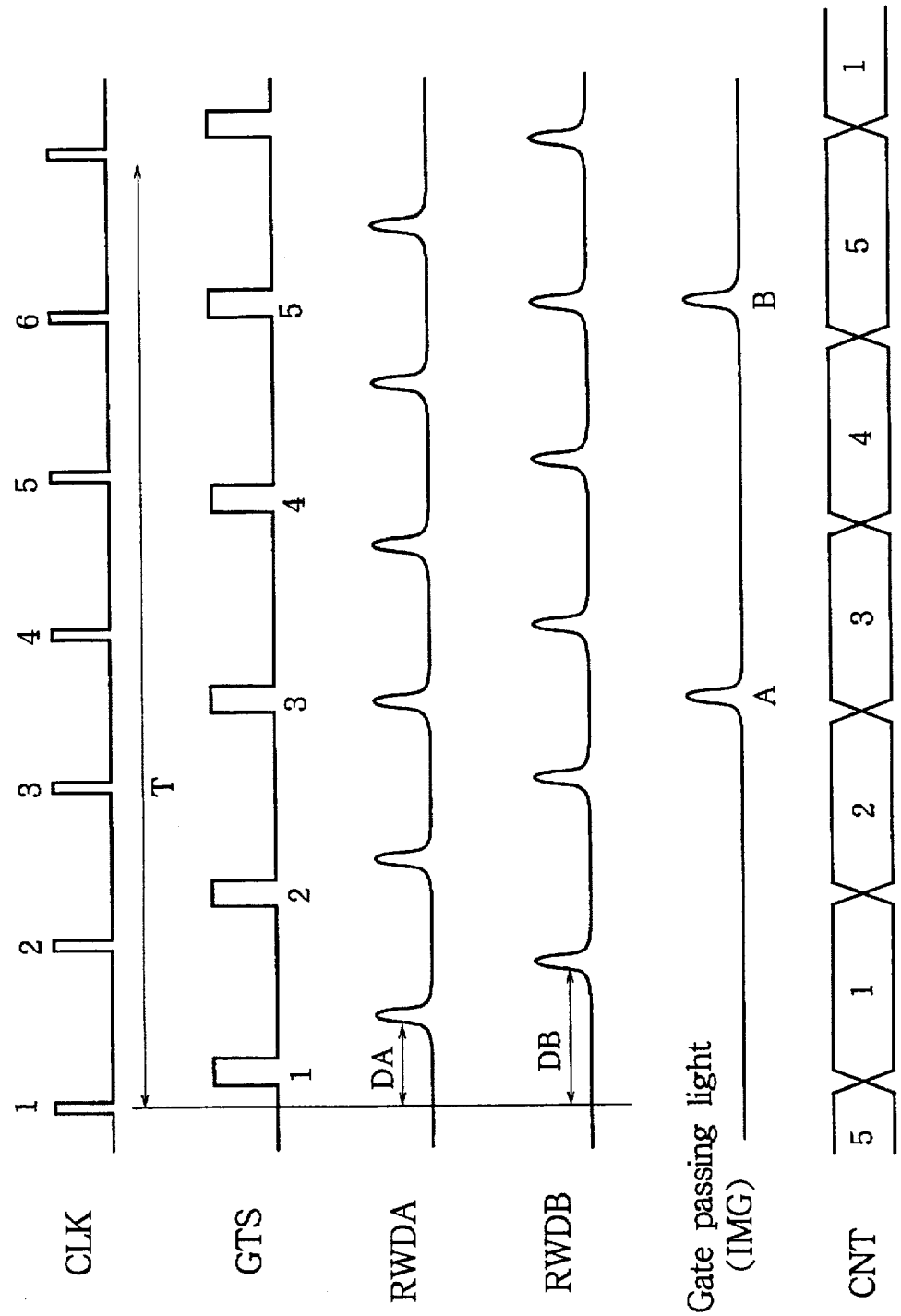
FIG. 2 is a timing chart, which shows an operational mode of the distance camera device shown in FIG. 1.

Referring next to FIG. 2 which is a timing chart showing the operational mode of the distance camera device of FIG. 1, the clock signal CLK is formed of an intermittent pulse train and contains, for example, six pulses in a predetermined cycle T. Besides, the gate signal GTS is formed of an intermittent pulse train and contains, for example, five pulses in the cycle T. The gate pulses illustrated in FIG. 2 are designated, in order, by K=1, 2, 3, 4, 5, respectively. The light gate controlling circuit 7 is composed, for example, of a delay counter and generates a gate signal GTS by delay counting process of the clock signal CLK. It is apparent, from comparison between the clock signal CLK and the gate signal GTS, that each pulse of the gate signal GTS increases its delay time from the corresponding pulse of the clock signal CLK as the number of aforementioned K increases. Thus, the gate signal GTS controls an open/close operation of the gating image intensifier 6, thereby forming a sliding type correlation device.

The primary light FWD which is pulse-modulated by the clock signal CLK contains therein a corresponding peak. Thus, the secondary light RWDA which is reflected from the portion A of the target object 12 contains similarly a peak therein. In compliance with the distance between the camera device and the portion A of the target object 12, a predetermined delay time (delay amount) DA is generated at the peak of the secondary light RWDA. Similarly, a delay time DB is generated in another secondary light RWDB reflected from the portion B of the target object 12 in accordance with the distance thereto. Since the portion B is located farther than the portion A, the delay time DB is larger than the delay time DA.

When the light gate means is opened in response to the first gate pulse, both A component and B component of the secondary light are delayed and, thus these components do not pass through the light gate means. When the light gate means is opened in response to the second gate pulse, A component or B component cannot pass therethrough, either. However, the situation is being closer to a coincident timing. When the light gate means is opened in response to the third gate pulse, the timing of the A component peak coincides with the opening of the light gate means to permit the A component to pass therethrough. In other words, the gate passing light at this moment contains the A component peak. Further, when the light gate means is opened in response to the fifth gate pulse, the B component coincides in timing with the opening of the light gate means to permit the B component peak to pass therethrough. At this moment, the gate passing light contains therein the B component peak. Thus, since the gate passing time is shifted backward, it becomes possible to extract distance information from the secondary light. The gate passing light is sequentially received by the CCD image sensor 8 and converted into the corresponding image signal IMG. The image signal IMG stored in the CCD image sensor 8 is sequentially read out in accordance with the count signal CNT. The count signal CNT is composed of the pulse trains (numbered K=1, 2, 3, 4, 5) corresponding to the aforementioned gate signal GTS.

Figure 3:
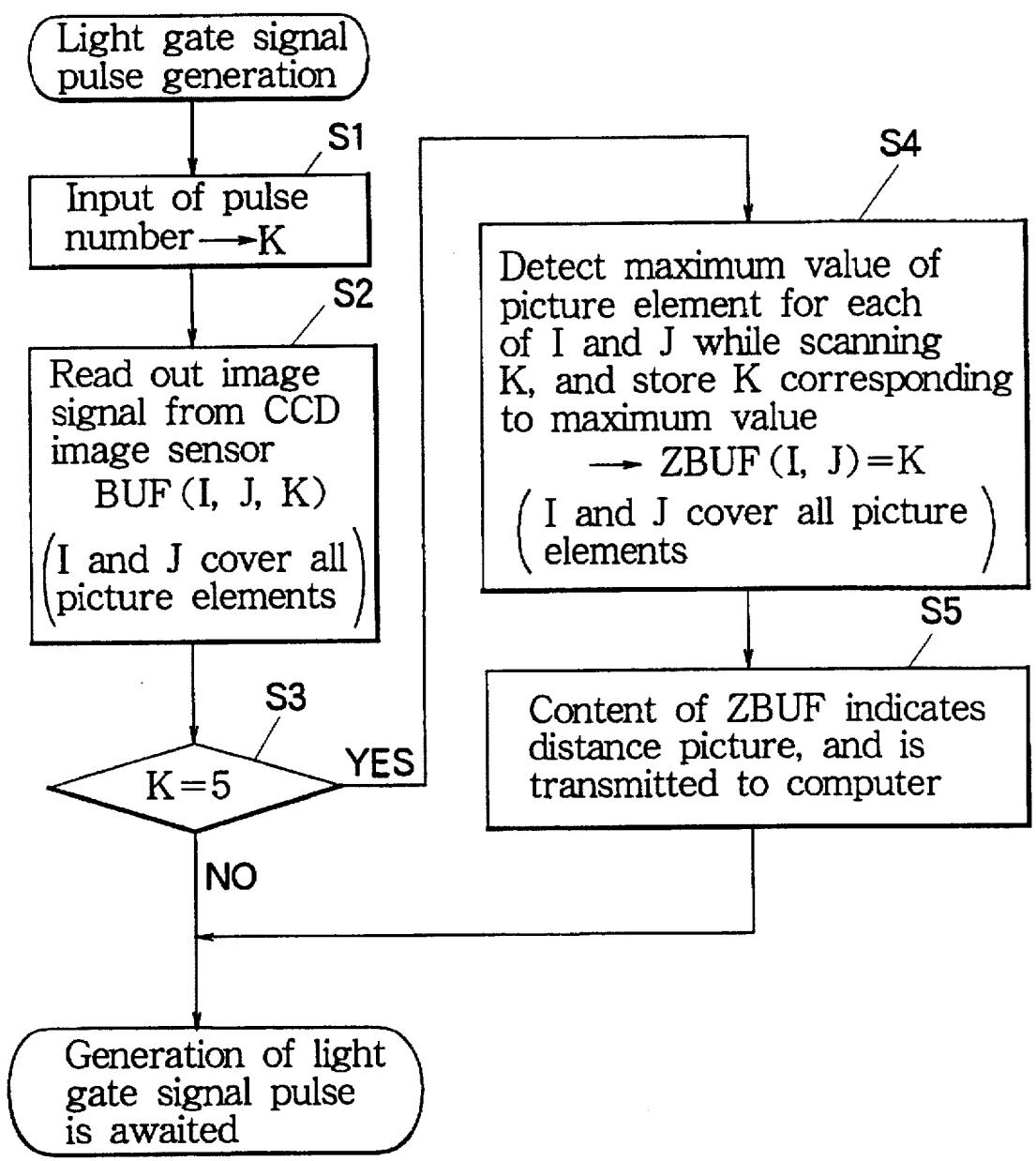
FIG. 3 is a flowchart showing the operation of the distance camera device shown in FIG. 1.

With reference to FIG. 3, an operation of the arithmetic circuit 9 installed in the distance camera device shown in FIG. 1 will be described. When the light gate signal pulse is generated as described above, the interrupting signal ITR is inputted from the light gate controlling circuit 7 to the arithmetic circuit 9 to thereby start a predetermined arithmetic program. First, at step S1, a pulse number K is read out from the count signal CNT. Incidentally, the pulse number K can be any of the numbers 1 to 5. Then, in step S2, the image signal IMG is read out from the CCD image sensor 8 and then stored in a frame (page) memory. The image data stored in the frame memory is indicated by BUF(I, J, K) wherein characters I and J indicate column number and row number, respectively, of all the picture elements. In next step S3, it is determined whether or not the pulse number K has reached "5". When it is less than "5", generation of a next gate signal is awaited and the situation is a stand-by state. When the next light gate signal is generated, another interrupting signal ITR is again inputted to repeat the previous steps headed by step S1.

When the pulse number is determined to be K=5, the operation proceeds to step S4. In the step S4, a maximum value with respect to the picture element data corresponding to each of "I" and "J" is detected while the pulse number K is scanned, and the value of K corresponding to the maximum value is stored in the frame memory. The thus obtained picture element data in the frame memory is represented as ZBUF(I, J)=K. Then the operation proceeds to step S5. Since the content of ZBUF is a distance image, it is transmitted to the computer 11. Thus, the arithmetic processing for one cyclical period T is completed to shift to a stand-by state. It will be understood from the foregoing description that five frame data BUF (I, J, K) are obtained per one cyclical period T. Thus, it is appreciated also that five image data have been obtained in time sequence for each picture element. One of the five image data which has a maximum value contains therein distance information which has passed through the light gate means. As described above, this distance information is represented by the pulse number K at the time of obtaining a maximum value, the distance information is obtained throughout all the picture elements to produce the frame data ZBUF, thereby obtaining a whole distance image.

In FIG. 4 showing a specific structure of the image intensifier 6, the secondary light RWD which enters the condensing lens 5 forms an objective image 21 on an input surface. A cathode element 22 is disposed on the input surface to constitute a light gate. A semiconductor film is provided on the surface of the cathode element 22 so that an amount of electron corresponding to the received secondary light RWD is discharged. The thus formed electron image is projected on a microchannel plate 24 only when the light gate is opened. Electrons that entered each channel of the microchannel plate 24 are multiplied several thousands times. Further, the electrons outputted from the microchannel plate 24 are accelerated by a high voltage power and forced to collide against a phosphor screen 25 and then converted into light. Thus, on the output surface is formed a bright image which is about ten thousand times in brightness of the input light. Thereafter, an intensified output image 26 is picked up by a CCD image sensor (not shown). In this case, a fiber-optic plate 27 is provided to obtain a sufficiently bright image, the fiber-optic plate 27 being formed of bundle of optical fibers to transmit two-dimensional information from one optical screen to another optical screen.

FIG. 5 shows a detailed structure of the microchannel plate 24. The microchannel plate 24 is a thin planar device and has a bundle of thin channels which have inner walls made of a suitable material having a secondary emission characteristic to form independent secondary emission doublers arranged in a two-dimensional manner. As shown in FIG. 6, the electrons which entered each channel 28 generate about two secondary electrons in average by one channel-wall collision for one electron. Thus, channel-wall collisions are repeated in the process that the incident electrons pass through the channels, and therefore are intensified to several thousand times.

Figure 7:
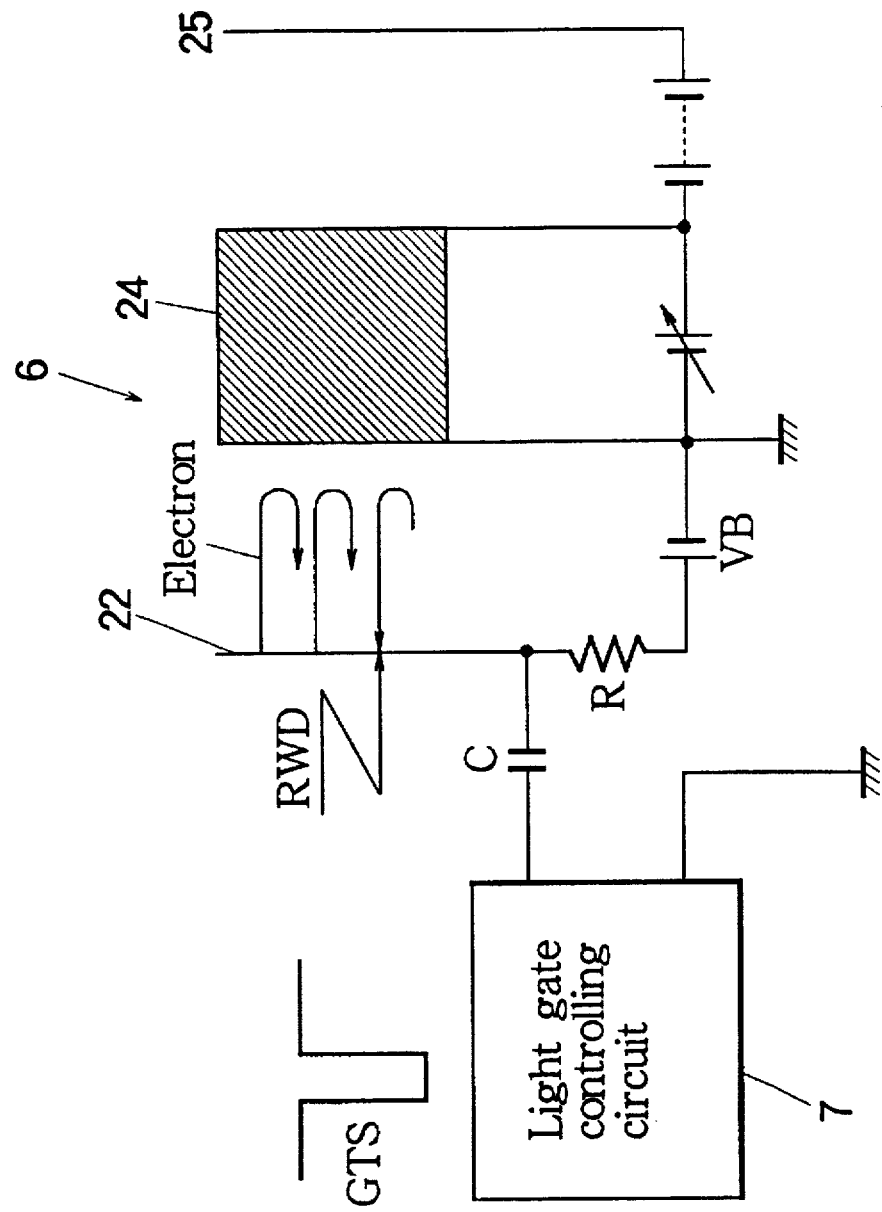
FIG. 7 is a circuit diagram of the image intensifier.

FIG. 7 is a diagram showing a light gate operation of the gating image intensifier shown in FIG. 4. The cathode element 22 is biased by a positive voltage VB through a resistor R relative to the microchannel plate 24. The light gate controlling circuit 7 is connected to the cathode element 22 through a capacitor C and, therefore, electrons which are generated by an incident of the secondary light RWD are not accelerated and thus cannot arrive at the microchannel plate 24. On the other hand, when a gate pulse GTS which has a large negative voltage is applied from the light gate controlling circuit 7, electrons generated on the surface of the cathode element 22 receives a large acceleration and is then driven to the microchannel plate 24. Therefore, the intensified image of the target object is formed on the phosphor screen 25 on the output surface. In general, a light passes three (3) meters in 10 nanoseconds and, accordingly, a responding speed required to the light gate is several tens of nanoseconds. In this respect, since the gating image intensifier is responsive in several nanoseconds, a desirable distance image with practically sufficient resolution can be generated.

Figure 8:
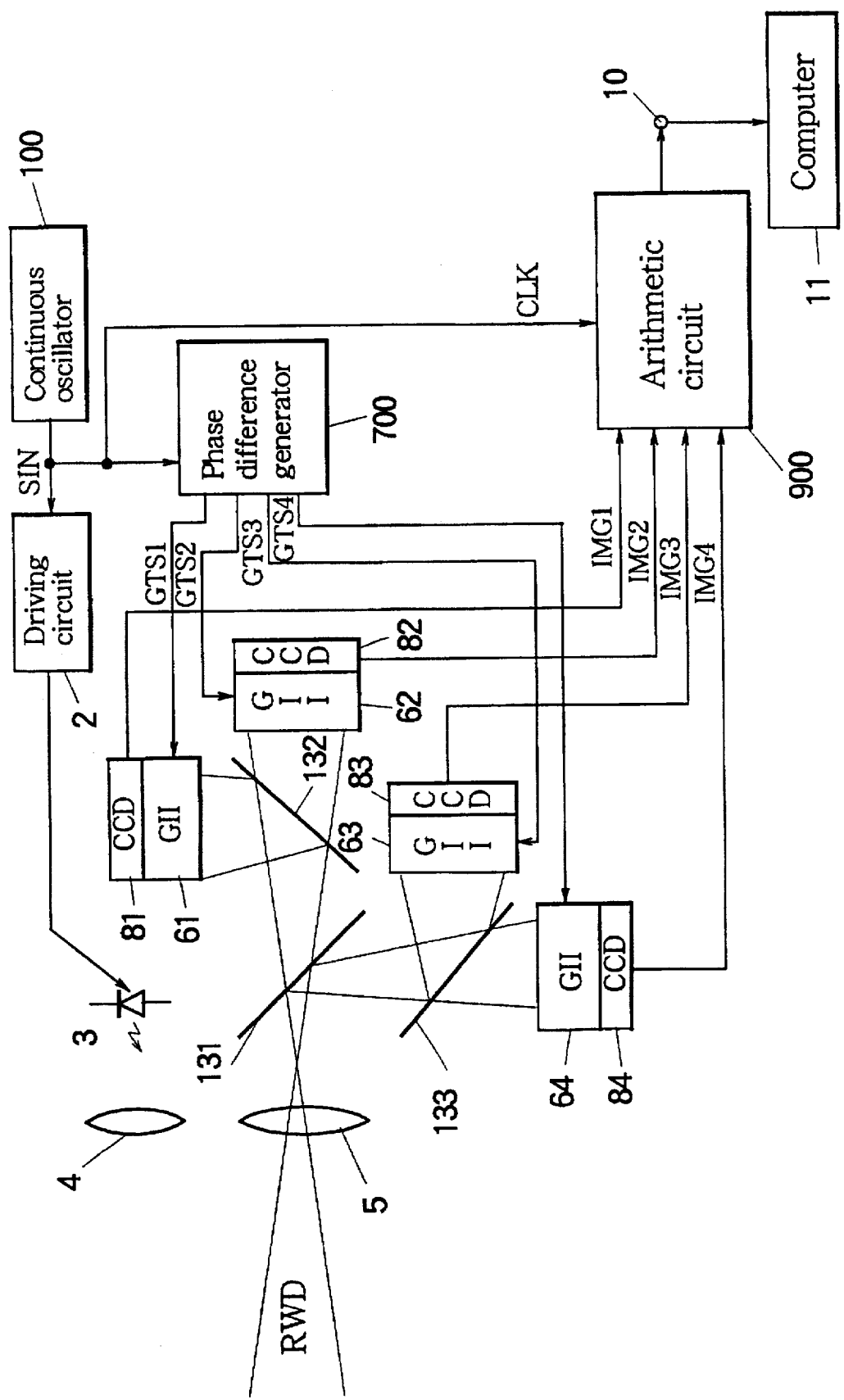
FIG. 8 is a block diagram of a distance camera device according to a second embodiment of the invention.

In FIG. 8 which shows a second embodiment of the invention, the basic construction is similar as that of the first embodiment shown in FIG. 1 and similar parts and elements are represented by the same reference numerals for appreciation of the invention. The second embodiment is, as described above, almost similar with that of the first embodiment except that a continuous oscillator 100 is used instead of the pulse oscillator 1 used in the first embodiment. The continuous oscillator 100 generates, for example, a reference signal SIN which has a sine waveform of a predetermined cycle. The driving circuit 2 drives the light emitting diode 3 in accordance with the sine wave reference signal SIN, and the light emitting diode 3 projects a continuously modulated primary light to a target object (not shown) through a lens 4. In addition to the above, in the second embodiment, a phase difference generating circuit 700 is used instead of the light gate controlling circuit 7 in the first embodiment. The phase difference generating circuit 700 operates to delay the reference signal SIN and outputs four sine wave gate signals GTS1, GTS2, GTS3, and GTS4. A phase difference of the gate signals is 90 degrees. For example, if a phase angle of GTS1 is 0 degree, the phase angles of GTS2, GTS3 and GTS4 are 90 degrees, 180 degrees, and 240 degrees, respectively. Further, in this embodiment, four sets of the combination of a CCD image sensor and a gating image intensifier (GII) are provided. In other words, the combination of the light gate means and the camera means are space-divided into four sets. However, the present invention is not limited to this structure, but time-division can be used instead of the space-division. A first set composed of GII 61 and CCD 81 undergoes a light-gating in accordance with GTS1 and generates a corresponding image signal IMG1. Similarly, a second set which is composed of GII 62 and CCD 82 undergoes the light-gating in synchronism with GTS2 and outputs a corresponding image signal IMG2. A third set composed of GII 63 and CCD 83, and fourth set composed of GII 64 and CCD 84 also receive their assigned gate signals and output corresponding image signals. In this embodiment, four gate signals GTS1 to GTS4 are supplied to each set of the CCD and GII in parallel. Alternatively, it is possible to supply GTS1 to GTS4 in a time-division manner to a single set of GII and CCD. These four sets of GII/CDD are connected to an arithmetic circuit 900 which arithmetically processes the IMG1 to IMG4 to produce a distance picture. Incidentally, the secondary light RWD reflected from the target object is two-divided by a first beam splitter 131 and one of the divided components is re-divided by a second beam splitter 132 and directed to GII 61 and GII 62. Besides, the other component which is divided by the first beam splitter 131 is re-divided by a third beam splitter 133 and directed to GII 63 and GII 64.

Figure 9:
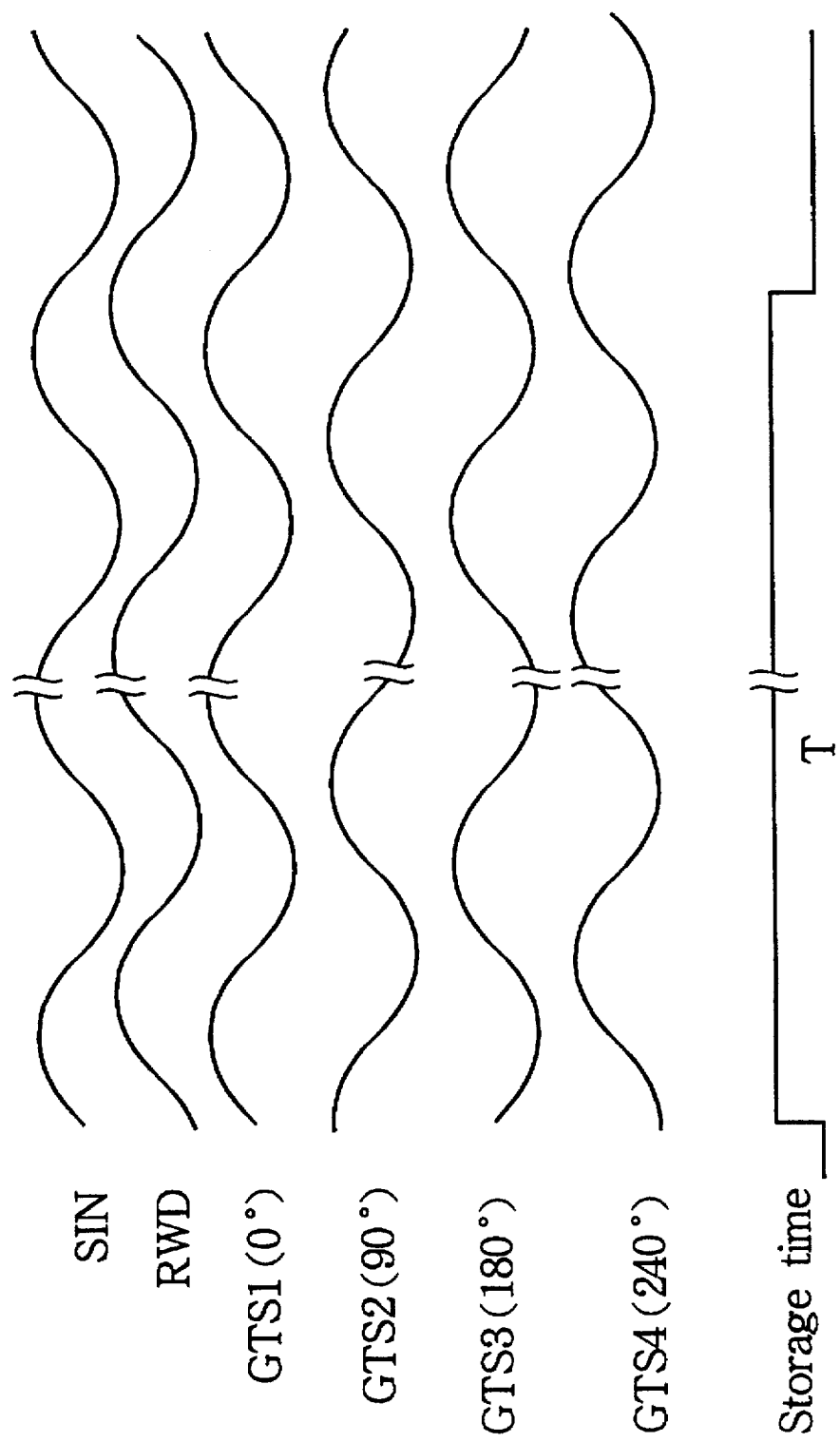
FIG. 9 is a timing chart which shows an operational mode of the distance camera device shown in FIG. 8.

FIG. 9 is a waveform diagram for illustrating operation of the distance camera shown in FIG. 8. As shown in FIG. 9, the reference signal SIN has a sine waveform of a predetermined cycle, according to which the primary light is continuously modulated in amplitude. The secondary light RWD reflected from the target object has various sine wave components which are delayed in accordance with different distances to each point of the object surface, although, for the purpose of reference only, one sine wave component is shown in the figure. Further, the first gate signal GTS1 has a sine waveform which is the same phase as the reference signal SIN. The second gate signal GTS2 is shifted 90 degrees relative to the first gate signal GTS1. Thus, considering that the first gate signal GTS1 is a sine wave, the second gate signal GTS2 is a cosine wave. Further, GTS3 is 180 degrees reversed in phase relative to the GTS1 and, similarly, GTS4 is 180 degrees reversed in phase relative to the GTS2. Therefore, GTS3 and GTS 4 have 90 degrees phase difference with each other.

GII 61 carries out light gating in synchronism with GTS1 and CCD 81 stores or accumulates the gated results for a predetermined period of time T. Therefore, it is understood that GII 61 and CCD 81 are cooperative to execute inner scalar product computing with respect to the secondary light RWD and the gate signal GTS1. Similarly, the set of GII 62 and CCD 82 executes the scalar product computing with respect to the secondary light RWD and the gate signal GTS2. By such correlative computing as described above, the phase information (distance information) contained in the secondary light RWD is orthogonally separated to provide a pair of image signals IMG 1 and IMG2 at a very high speed and real time (simultaneously). In other words, computing of the orthogonal phase components permits to obtain phase information of the secondary light RWD.

It is to be noted that a light intensity value is always positive, and this does not enable to provide a negative value which is necessary in correlative computing. Otherwise, a DC component could not be removed. Thus, in this embodiment, GTS3 which is phase-reversed relative to GTS1 and GTS4 which is phase-reversed relative to GTS2 are utilized to proceed with scalar product computing so that image signals IMG3 and IMG4 which have phase components of a negative part are generated.

Figure 10:
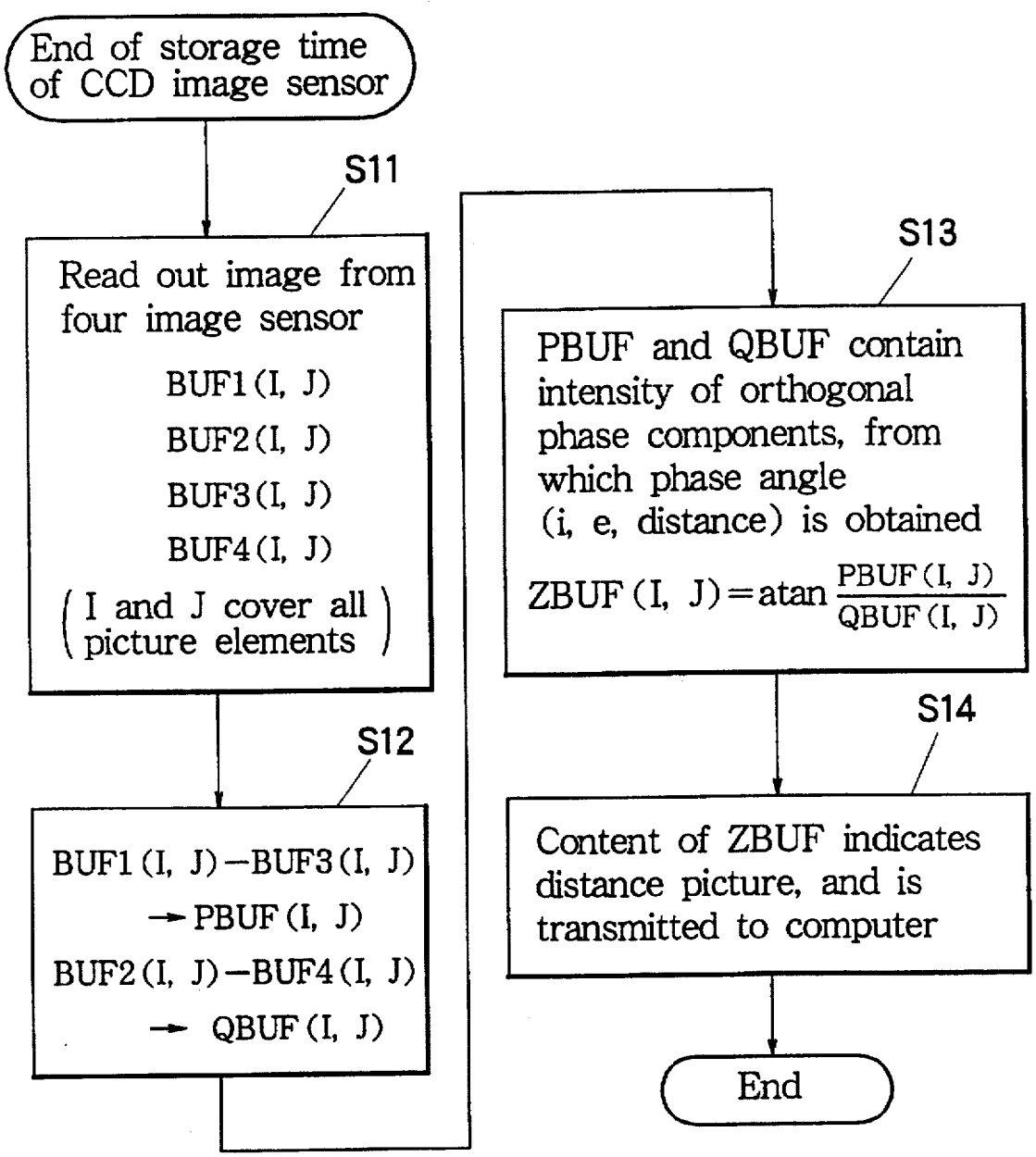
FIG. 10 is a flow chart showing the operation of the distance camera device shown in FIG. 8.
Figure 11:
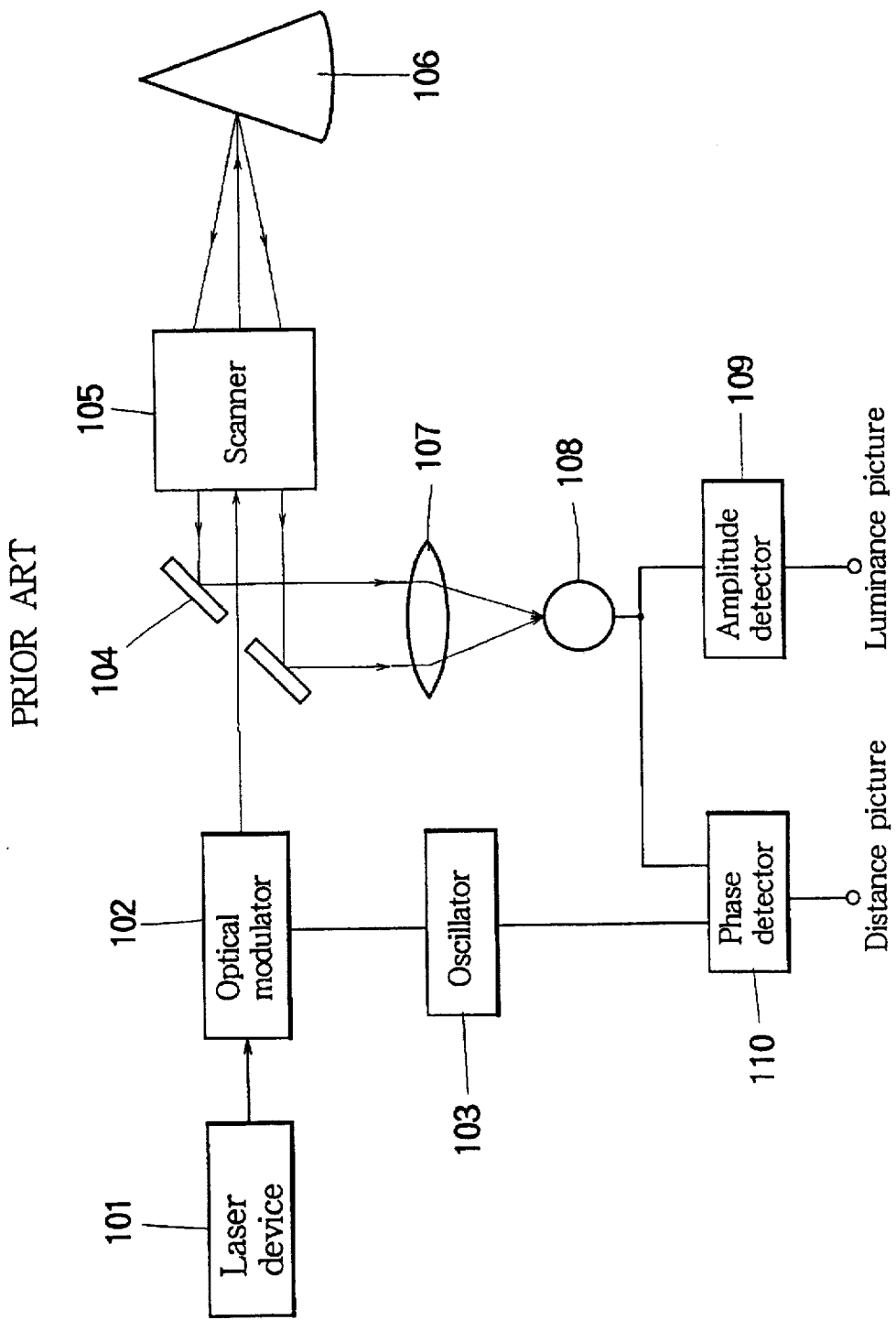
FIG. 11 (Prior Art) is a block diagram of a conventional distance camera device.

An operation of the arithmetic circuit 900 shown in FIG. 8 will be described in detail with reference to a flow chart of FIG. 10. When the storage time T of the CCD image sensors 81–84 is finished, the image signals IMG1–IMG4 are, at first, read out from the four CCD image sensors 81–84 at step S11 and are stored in each frame memory. The stored image data are represented by BUF1(I, J), BUF2(I, J), BUF3(I, J) and, BUF4(I, J), in which characters I and J represent a column number and a row number which cover all the picture elements. In next step S12, BUF1(I, J)-BUF2 (I, J) are computed relative to the corresponding I and J to obtain PBUF(I, J). Similarly, BUF2(I, J)-BUF4(I, J) are computed to obtain QBUF(I, J). It is understood that DC components are removed from the obtained PBUF(I, J) and QBUF(I, J).

The operation proceeds next to step S13. PBUF and QBUF indicate an intensity of the orthogonal phase components and, accordingly, a phase angle, that is, a distance can be obtained therefrom. Specifically, computing is made to ZBUF(I,J)=atan(PBUF(I,J)/QBUF(I,J)) relative to corresponding I and J. Since the content of ZBUF indicates a distance picture itself, this is transmitted to the computer at step S14.

According to the present invention, the primary light modulated according to the reference signal is projected to a three-dimensional target object and a secondary light reflected from the object is then detected in its phase by a light gate means and a camera means, and distance data of each part of the target object appearing on the picture elements of the camera means can be obtained. By this, a small size and handy distance camera device can be realized and, in addition, a three-dimensional shape of the distant target object can be accurately detected. Further, two pairs of light gate means and camera means are used to compute a negative part of the correlation computing in the phase detection so that a DC component is excluded, thereby enabling an accurate phase detection. Further, employing four sets of light gate means and camera means, values of orthogonal phase components are obtained to detect the phase from a ratio of these values, so that more accurate distance picture can be obtained with less time. Thus, real time characteristics of the distance camera can be increased.

What is claimed is:

1. A distance camera device comprising: oscillation means for generating a predetermined reference signal used as a time reference; projecting means for emitting a primary light modulated in accordance with the reference signal and irradiating the primary light onto a three-dimensional target object; condensing means for collecting a secondary light reflected back from the target object; light gating means disposed in a path of the secondary light for selectively gating the passing secondary light in synchronism with a pair of gate signals having a phase difference of 90° with respect to each other and being produced in accordance with the reference signal to thereby extract distance information composed of phase components which are orthogonal to each other concerning the target object contained in the secondary light; camera means for receiving the gated secondary light and outputting a corresponding image signal; and arithmetic computing means for processing the image signal and producing a distance picture of the target object.

2. A distance camera device comprising: oscillation means for generating a predetermined reference signal used as a time reference; protecting means for emitting a primary light modulated in accordance with the reference signal and irradiating the primary light onto a three-dimensional target object; condensing means for collecting a secondary light reflected back from the target object; light gating means disposed in a path of the secondary light for selectively gating the passing secondary light in synchronism with a pair of gate signals having a phase difference of 180° with respect to each other to thereby extract distance information composed of a pair of positive and negative phase components concerning the target object contained in the secondary light; camera means for receiving the gated secondary light and outputting a corresponding image signal; and arithmetic computing means for processing the image signal and producing a distance picture of the target object.

3. A distance camera device according to claim 1; wherein the projecting means includes means for protecting a primary light which is intermittently modulated according to an intermittent reference signal; and the light gating means includes means for gating the secondary light in synchronism with intermittent gate signals to thereby extract distance information.

4. A distance camera device according to claim 1; wherein the light gating means includes means for gating the secondary light in synchronism with continuous gate signals so as to extract distance information.

5. A distance camera device according to claim 1; wherein the camera means is of a storage type and cooperates with the light gating means for effectively computing a scalar product of the secondary light and the gate signal to obtain correlated distance information.

6. A distance camera device according to claim 3; wherein the intermittent gate signals are pulse modulated signals.

7. A distance camera device according to claim 4; wherein the projecting means includes means for projecting a continuously modulated primary light.

8. A distance camera device according to claim 7; wherein the continuously modulated primary light has an amplitude modulated intensity.

9. A distance camera device according to claim 5; wherein the camera means has a two-dimensional pixel array comprising a CCD device which receives the secondary light and converts the light into the image signal.

10. A distance camera device according to claim 2; wherein the projecting means includes means for projecting a primary light which is intermittently modulated according to an intermittent reference signal; and the light gating means includes means for gating the secondary light in synchronism with intermittent gate signals to thereby extract distance information.

11. A distance camera device according to claim 10; wherein the intermittent gate signals are pulse modulated signals.

12. A distance camera device according to claim 2; wherein the projecting means includes means for gating the secondary light in synchronism with continuous gate signals so as to extract distance information.

13. A distance camera device according to claim 12; wherein the projecting means includes means for projecting a continuously modulated primary light.

14. A distance camera device according to claim 2; wherein the camera means is of a storage type and cooperates with the light gating means for effectively computing a scalar product of the secondary light and the gate signal to obtain correlated distance information.

15. A distance camera device according to claim 14; wherein the camera means has a two-dimensional pixel array comprising a CCD device which receives the secondary light and converts the light into the image signal.

16. A range imaging device comprising: an oscillator for producing a modulated reference signal; a light source driven by the modulated reference signal to emit a modulated primary light onto a three-dimensional target; image gating and intensifying means disposed in a path of light reflected by the target for gating and intensifying the reflected light; a gate control circuit for producing a pair of modulated gating signals dependent upon the modulated reference signal for driving the image gating and intensifying means to extract distance information from the target contained in the reflected light; an image pickup device having a two dimensional pixel array receptive of the gated reflected light to produce a corresponding electrical image signal; and a computer for processing the image signal to produce a range image of the target; wherein the pair of gate signals have a phase difference of 90° with respect to each other to thereby extract distance information composed of phase components which are orthogonal to each other.

17. A range imaging device according to claim 16; further comprising a condenser lens disposed in the path of the reflected light between the target and the image gating and intensifying means for collecting and condensing the reflected light.

18. A range imaging device according to claim 16; wherein the modulated reference signal is pulse modulated so as to drive the light source to emit a pulse modulated primary light in accordance with the pulse modulated reference signal; and the gating signals are pulse modulated to drive the image gating and intensifying means to extract distance information.

19. A range imaging device according to claim 16; wherein the modulated reference signal is continuously modulated so as to drive the light source to emit a continuously modulated primary light in accordance with the continuously modulated reference signal; and the gating signals are continuously modulated to drive the image gating and intensifying means to extract distance information.

20. A range imaging device according to claim 16; wherein the two-dimensional pixel array of the image pickup device comprises a CCD device which cooperates with the image gating and intensifying means to compute a scalar product of the reflected light and the gating signals to obtain correlated distance information.

21. A range imaging device comprising: an oscillator for producing a modulated reference signal; a light source driven by the modulated reference signal to emit a modulated primary light onto a three-dimensional target; image gating and intensifying means disposed in a path of light reflected by the target for gating and intensifying the reflected light; a gate control circuit for producing a pair of modulated gating signals dependent upon the modulated reference signal for driving the image gating and intensifying means to extract distance information from the target contained in the reflected light; an image pickup device having a two dimensional pixel array receptive of the gated reflected light to produce a corresponding electrical image signal; and a computer for processing the image signal to produce a range image of the target; wherein the pair of gate signals having a phase difference of 180° with respect to each other to thereby extract distance information composed of a pair of positive and negative phase components.

* * * * *